United States Patent [19]

Sellers et al.

[11] 4,107,675
[45] Aug. 15, 1978

[54] TRANSPONDER-RESPONDER SYSTEM

[76] Inventors: John C. Sellers, 8702 Morton Ave., Brooklyn, Ohio 44144; James A. Romanauski, 8800 Farbar, Kirtland, Ohio 44094

[21] Appl. No.: 774,520

[22] Filed: Mar. 4, 1977

[51] Int. Cl.² .............................................. G01S 9/56
[52] U.S. Cl. ............................. 343/6.5 LC; 343/6.5 R
[58] Field of Search ........... 343/6.5 R, 6.5 LC, 6.8 R, 343/760; 235/103

[56] References Cited

U.S. PATENT DOCUMENTS

| | | | |
|---|---|---|---|
| 3,243,801 | 3/1966 | Bell et al. ........................... | 343/6.8 R |
| 3,750,168 | 7/1973 | Schrader et al. ................... | 343/6.5 R |
| 3,778,833 | 12/1973 | Castrovillo et al. ................ | 235/103 |
| 3,866,221 | 2/1975 | Hikosaka ......................... | 343/6.5 LC |
| 3,945,006 | 3/1976 | Cleeton .............................. | 343/6.5 R |

*Primary Examiner*—Maynard R. Wilbur
*Assistant Examiner*—Lawrence Goodwin

*Attorney, Agent, or Firm*—Gifford, Chandler, VanOphem, Sheridan, and Sprinkle

[57] ABSTRACT

A transponder-responder system is provided which comprises a home station and at least one remote station. A transmitter at the home station periodically generates interrogation pulses by means of a directional sweep antenna across a search area. Each remote station includes a receiver and transmitter. Upon receipt of an interrogation pulse by the remote station receiver and while enabled, the remote station transmitter transmits a digitally encoded response signal which is received by a receiver at the home station. Upon receipt of the response signal by the home station receiver, timing circuitry at the home station determines the distance between the home and remote station by measuring the elapsed time between the transmission of the last interrogation pulse and the receipt of the response signal. Additionally, the home station includes circuitry which determines the rotational position of the sweep antenna and circuitry which decodes the response signal.

7 Claims, 4 Drawing Figures

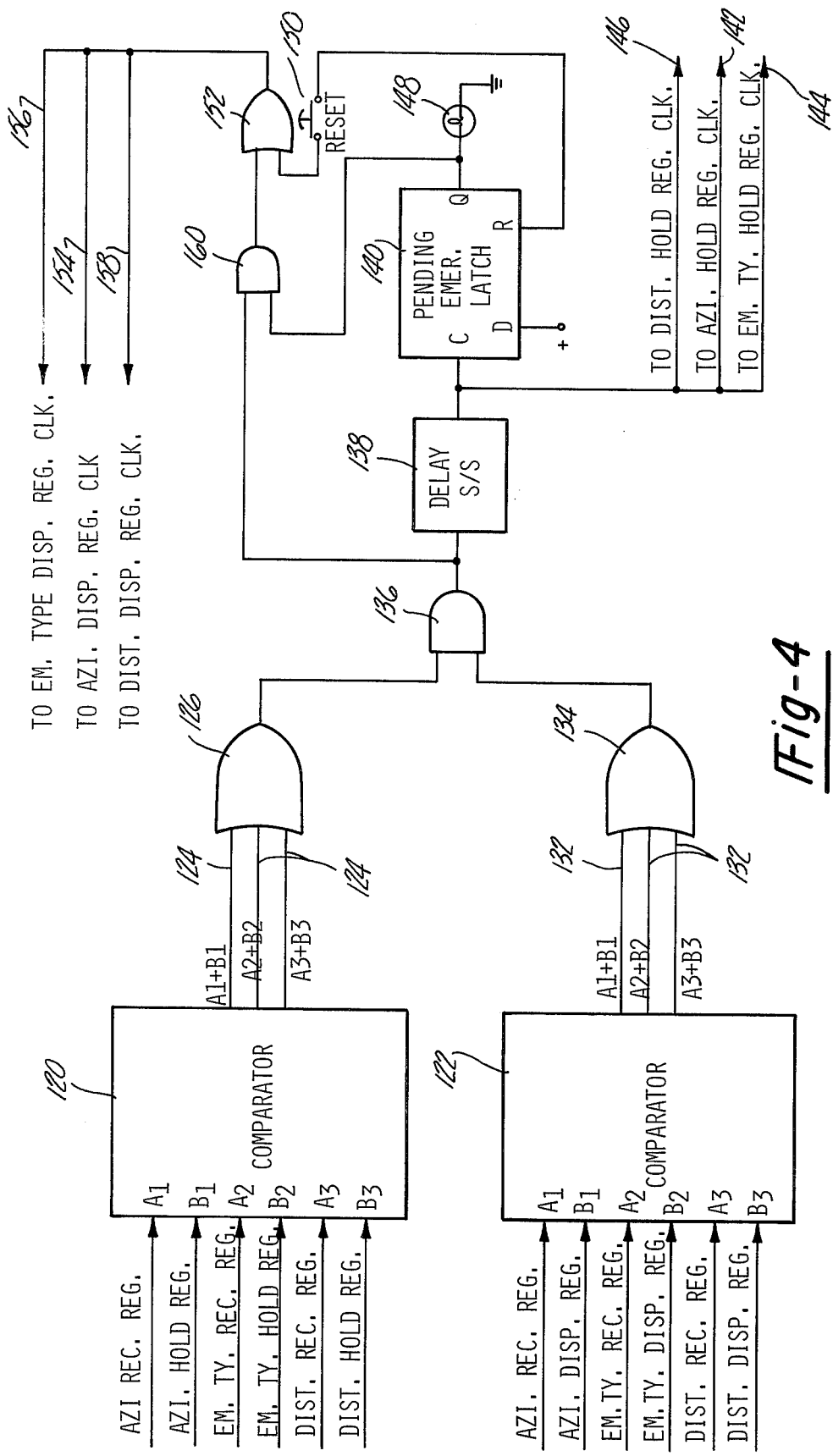

TRANSPONDER-RESPONDER SYSTEM

BACKGROUND OF THE INVENTION

I. Field of the Invention

The present invention relates generally to transponder-responder systems and, more particularly, to such a system in which a remote station generates an emergency distress signal in response to an interrogation signal from a home station. The home station receives the emergency distress signal and includes circuitry which not only determines the location of the remote station but also decodes the distress signal to thereby determine the type of emergency in accordance with a preset code.

II. Description of the Prior Art

The sport or hobby of boating, both power and sail, has enjoyed increased popularity in recent years. Due to the increase in cost with the increase in size of such boats, many if not most of such boats in use today are relatively small in size.

These small crafts, however, lack both the navigational and structural sophistication of large vessels. As a result, these small crafts oftentimes go astray of their intended course and become grounded, strike reefs, and the like.

Moreover, small boats are particularly susceptible to other emergency situations. For example, such boats frequently run out of gas or suffer engine damage or failure such that the boat cannot return to shore. Still more serious emergency situations can arise in small boats during bad weather conditions when some boats can even be capsized.

Heretofore, small boats endangered by one emergency situation or another have relied primarily on a visual sighting and the aid of rescuers to provide the needed help. The visual sighting of a boat in distress, of course, can be accomplished from another boat, airplane, helicopter or the like.

The visual sighting of a boat in distress, however, is hampered by weather conditions such as fog and rain and also by nightfall. In fact, when the approximate location of a missing ship is unknown, a night search in an attempt to locate the missing ship is virtually useless. As a result of all of these factors, the ultimate sighting of a ship in distress oftentimes is too late to aid its occupants.

In order t minimize the above-mentioned dangers, many ships now have radio telephones installed in them. Such radio telephones, while expensive to obtain, are effective in signaling for help when the captain of the ship knows his location in the water. However, in many situations and particularly in bad weather, the ship is diverted from the course and the captain is unaware of his location. In this event, the position of the ship can still be identified by triangulation. Triangulation, however, is not precise so that only the approximate location of the ship can be determined. Moreover, triangulation is expensive since it requires at least two and preferably three spaced receivers at predetermined locations, typically along the shoreline. Consequently, the triangulation method to locate the position of a ship in distress is not widely used except in extreme emergencies.

SUMMARY OF THE PRESENT INVENTION

The present invention overcomes the above-mentioned disadvantages and dangers of boating by providing a simple, inexpensive and yet effective transponder-responder system for both determining the position of a ship in distress and for determining the nature of the emergency.

The transponder-responder system of the present invention comprises a home station and at least one remote station, each which includes its own transmitter and receiver. The home station transmitter periodically generates a high frequency interrogation pulse by means of a directional sweep antenna across a search area. Mechanical means, of course, rotate the sweep antenna in a predetermined arc so that with a given series of interrogation pulses, the entire sweep area can be covered.

The remote stations are preferably positioned on board ships, boats and the like and can be activated during an emergency situation. When activated and upon receipt of an interrogation pulse from the home station, the remote station transmitter transmits a digitally encoded pulse train back to the home station. The encoding of the digital response signal from the remote station can be manually preset at the remote station to reflect the type of emergency in progress.

Upon receipt of the response signal by the home station, the home station determines the elapsed time between the transmission of the last interrogation pulse and the receipt of the response signal from the remote station. The elapsed time, of course, is indicative of the distance between the home and remote stations.

Simultaneously, upon receipt of a response signal, the home station determines and stores the rotational position of the sweep antenna which, in conjunction with the distance between the home and remote stations, determines the precise location of the remote station and, consequently, the location of the ship in distress.

Lastly, upon receipt of a response signal, the home station decodes the digitally coded respnse signal to thereby determine the nature of the emergency. Thus for example, in the event of the receipt of a distress signal indicating that a first ship is sinking and a second distress signal indicating that a second ship is out of fuel, the sinking ship would receive the priority in the subsequent rescue operations.

As will become hereinafter apparent, both the home and the remote stations are simple in construction and yet effective in operation. Moreover, due to the advent of integrated circuitry, both the remote and home stations can be economically constructed and utilized.

BRIEF DESCRIPTION OF THE DRAWINGS

FIG. 4 is a block diagrammatic view illustrating another portion of the home station of the transponder-responder system of the present invention.

DETAILED DESCRIPTION OF THE PRESENT INVENTION

Figure 1:
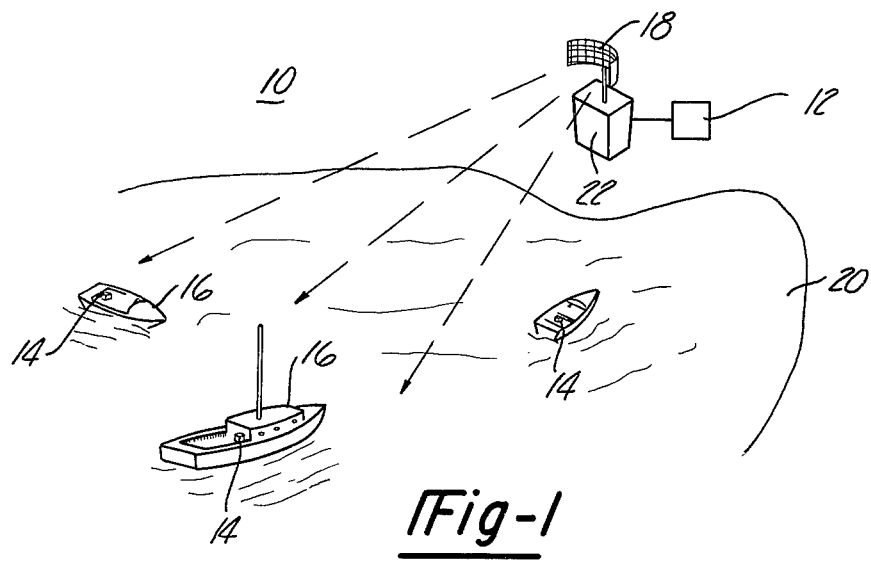
FIG. 1 is a partial diagrammatic view illustrating the operation of the transponder-responder system of the present invention.

With reference first to FIG. 1 the transponder-responder system 10 of the present invention is there illustrated diagrammatically and illustrates one possible use of the system 10. The system 10 comprises a home station 12 and at least one remote station 14. In the exemplary use of the system 10 illustrated in FIG. 1, the home station 12 is positioned on land while the remote stations 14 are carried aboard small boating crafts 16 at a position spaced from the home station 12.

The home station 12 includes a directional antenna 18 which is directed across an area to be searched, e.g., a water body 20. Conventional mechanical means 22 reciprocally rotate the antenna 18 so that within a predetermined time period the entire search area 20 will be scanned by the antenna 18.

In a manner which will be subsequently described in greater detail, the home station 12 periodically generates an interrogation pulse by means of the diirectional antenna 18 across the search area 20. The remote station 14, when activated by the operator, in turn transmits a distress or response signal upon receipt of an interrogation pulse from the home station 12. The distress signal is detected by the home station 12 which calculates not only the position of the remote station 14 transmitting the distress signal but also decodes the distress signal to determine the type of emergency encountered at the remote station 14.

Figure 3:
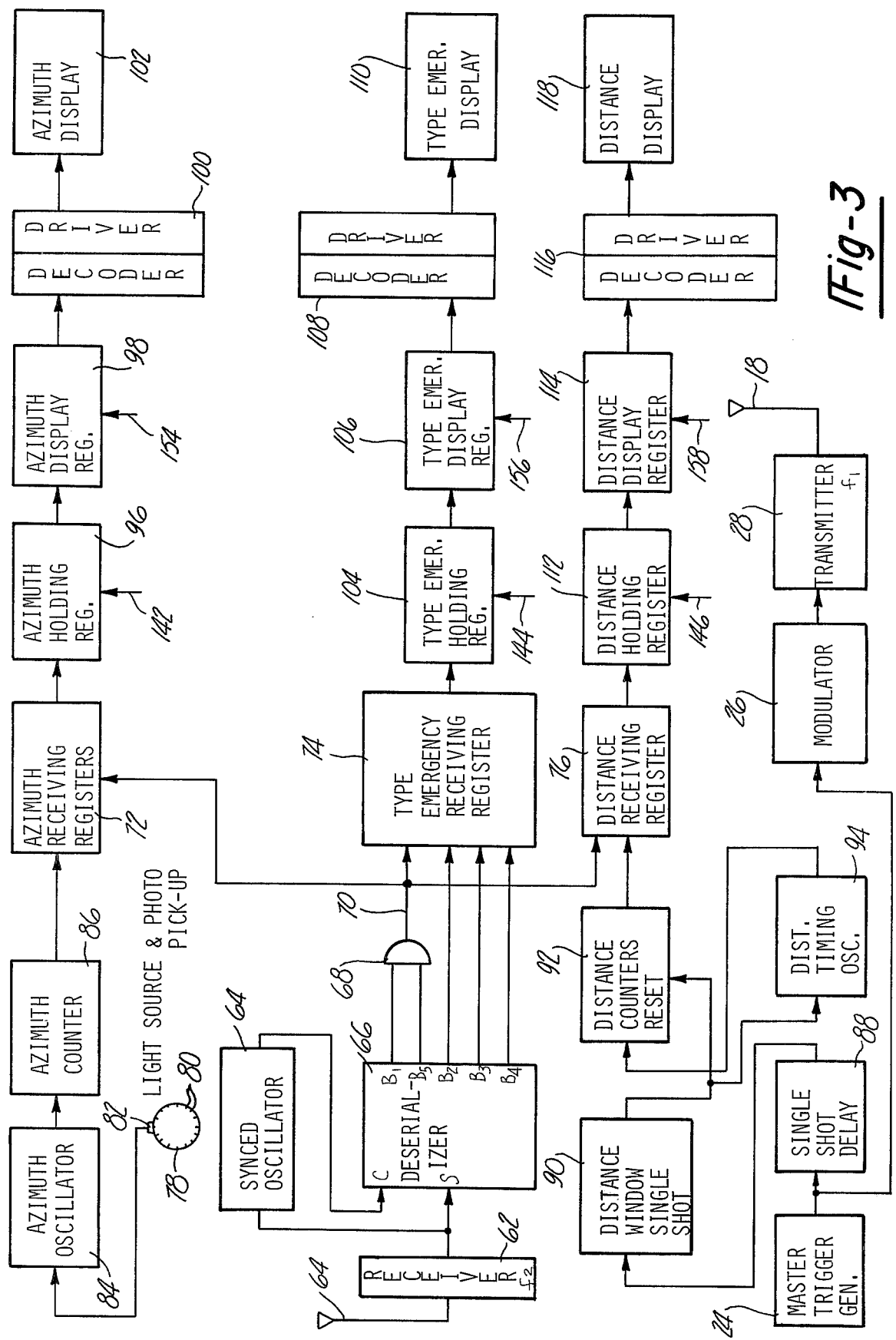
FIG. 3 is a block diagrammatic view illustrating a portion of a home station of the transponder-responder system of the present invention.

The circuitry of the home station is illustrated in FIG. 3 and includes a master trigger generator 24 which periodically generates a pulse to a modulator 26. The output from the modulator 26 is coupled to a transmitter 28 which transmits a pulse at a predetermined frequency $f_1$ via the directional antenna 18. Preferably, a master trigger generator generates a one-half microsecond interrogation pulse every millisecond and in addition the frequency $f_1$ is a high frequency to insure the directional nature of the transmitted interrogation pulse.

Figure 2:
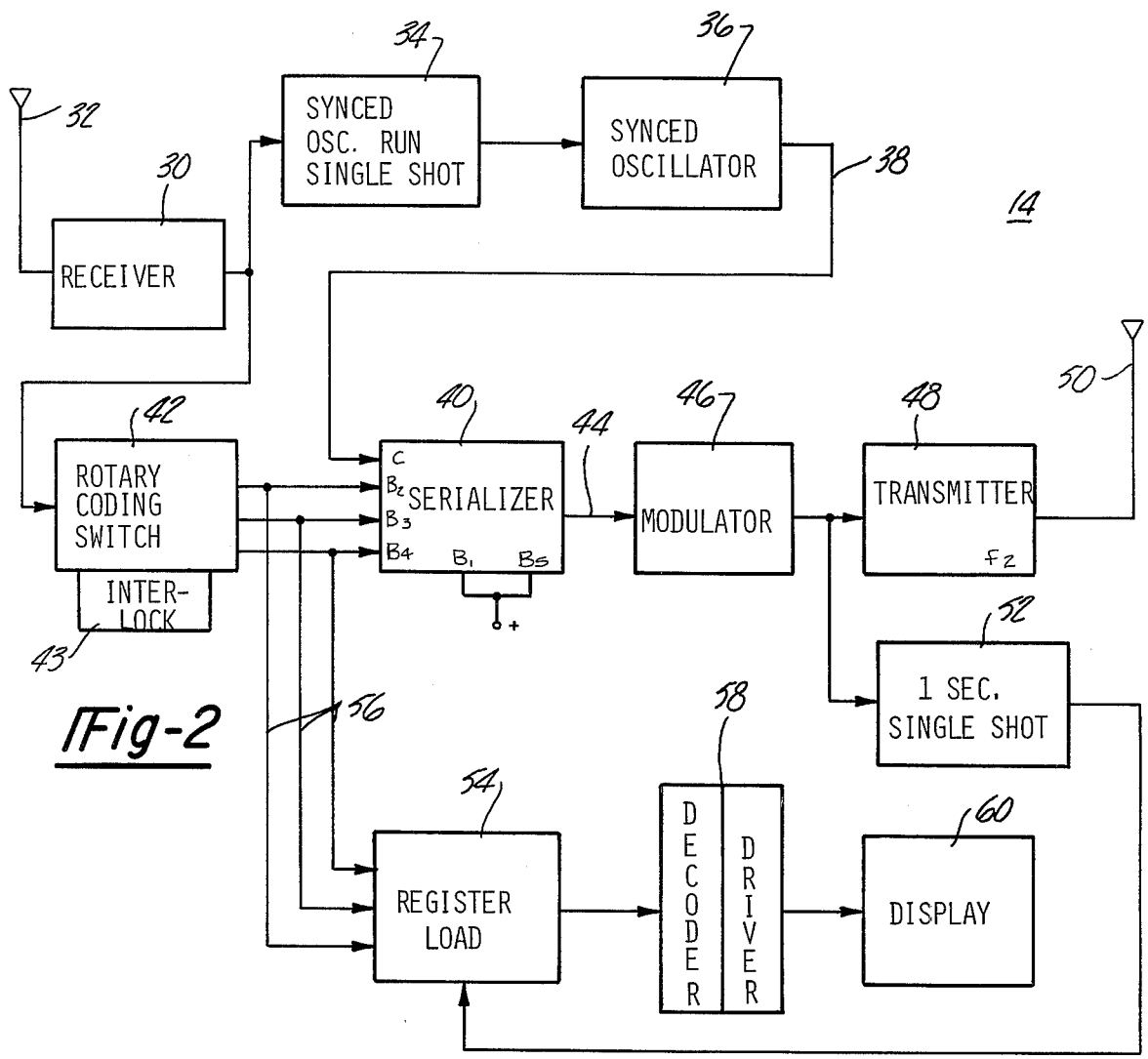
FIG. 2 is a block diagrammatic view illustrating a remote station of the transponder-responder system of the present invention.

The circuitry for the remote station 14 is illustrated in FIG. 2 and includes a receiver which is tuned to receive the interrogation pulse from the home station via an antenna 32. The receiver 30 in turn generates an output to a multivibrator or single shot 34 which activates a synchronized oscillator 36 for the duration of the output of the pulse from the single shot 34. The frequency of the synchronized oscillator 36 is designed in collaboration with the pulse width from the single shot 34 such that the oscillator generates five pulses at its output 38 during receipt of an input pulse from the single shot 34.

The synchronized oscillator output 38 is coupled to the clock input of a five bit parallel-to-serial shift register or serializer 40, such as Texas Instruments Part No. SN7496. The first and fifth bit positions B1 and B5 of the serializer 40 are maintained at a binary one level while the remaining bit positions B2-B4 of the input to the serializer 40, are preset by the operator by any conventional means, such as a rotary coding switch 42. It will, of course, be appreciated that eight different binary combinations can be produced by the rotary coding switch 42 with its three bit output.

With the rotary coding switch preset, the synchronized oscillator 36 produces a five bit serial signal at the output 44 of the serializer 40 which in turn is fed to the input of a modulator 46. The modulator 46 generates an output signal through a transmitter 48 and to an antenna 50 at the remote station 14. The transmitter 48, however, transmits at a frequency $f_2$ different from frequency $f_1$ so that the distress signal emitting from the transmitter 48 is not interpreted by other remote stations 14 as an interrogation signal.

The output from the modulator 46 is also coupled to the input of a multivibrator or single shot 52 which generates a pulse to the load input of a register 54. The outputs from the rotary coding switch are coupled by lines 56 to the data inputs of the register 54. Thus upon transmission of a distress signal, the binary outputs from the rotary coding switch are loaded into the register 54. The outputs from the register 54 are coupled through a decoder/driver 58 to an appropriate display 60, such as a seven-segment LED display. Consequently, upon transmission of a distress signal, the display 60 is activated which provides an indication to the operator at the remote station 14 that a distress signal has been sent.

In summation, upon receipt of an interrogation pulse by the remote station 14 and when activated, the remote station 14 generates a serially encoded output signal which is transmitted by the transmitter 48. The coding of the serial distress signal can be varied by the operator at the remote station by means of the rotary coding switch 42. In addition, upon transmission of a serially encoded distress signal, the display 60 is illuminated with a digital number representative of the serial encoding of the distress signal transmitted and indicative that a distress signal has been transmitted by the remote station 14. Any appropriate means, of course, such as an on/off switch on the receiver 30, can be used to deactivate the remote station 14 when the transmission of a distress signal is neither required nor desired. In addition, activation of the remote station 14 preferably simultaneously activates an interlock means 43 for the rotary coding switch 43. The interlock means 43 would prevent adjustment of the switch 42 while the remote station is activated and may be of any suitable mechanical or electronic construction.

Referring now back to FIG. 3, the home station 12 includes a receiver 62 tuned to the distress signal frequency $f_2$ which receives the distress signal by way of an antenna 64 (which may also be the antenna 18). The output from the receiver 62 activates a synchronized oscillator 64 operating at the same frequency as the synchronized oscillator 36 at the remote station 14. The output from the synchronized oscillator 64 is fed to the clock input of a five bit serial-to-parallel shift register or deserializer 66 while the output from the receiver 62 is fed into the serial input of the deserializer 66. At the end of five output pulses from the synchronized oscillator 64, the output bit positions B1 and B5, which are always a binary one despite the encoding of the rotary coding switch 42 at the remote station, are fed to the inputs of an AND gate 68 which generates a strobe pulse at its output 70. The strobe pulse from the AND gate 68 is fed to the load input of an Azimuth receiving register 72, a Type Emergency receiving register 74 and a Distance receiving register 76.

Still referring to FIG. 3, the data inputs to the Azimuth receiving register 72 are determined by the rotational position of an Azimuth wheel 78 which rotates in unison with the directional antenna 18. The Azimuth wheel 78 includes conventional scribe markings 80 which are detected by a light source and photo pickup 82 on the Azimuth wheel and fed to an Azimuth oscillator 84. Since the Azimuth wheel 78 typically includes markings 80 at one degree intervals, the Azimuth oscillator 84, for example, will generate 60 pulses indicative of Azimuth minutes, between each of the markings 80 while the output from the photo pickup 82 acts as a synchronizing signal for the oscillator 84. The output from the oscillator 84 is fed to a counter 86 so that the count in the counter 86 is representative of the Azimuth position of the wheel 78 and hence of the directional antenna 18. The output from the counter 86 in turn is coupled to the data inputs of the Azimuth receiving register 72. Thus upon receipt of a strobe signal from the AND gate 68 the count in the counter 86 representing the Azimuth position of the antenna 18, is loaded into the Azimuth receiving register 72.

The Type Emergency receiving register 74 receives the bit outputs B2–B4, representative of the position of the rotary coding switch 42 at the remote station 14, as its data inputs at the time the stobe pulse is generated by the AND gate 68. Consequently, the three bit binary number stored in the Type Emergency receiving register 74 is indicative of the type of emergency encountered at the remote station 14. The binary encoded emergency signals can, of course, be assigned any arbitrary value. For example, a Type Emergency code 2 may be indicative that the operator at the remote station 14 has run out of fuel whereas an emergency code 6 can indicate that the craft is sinking.

The input to the Distance receiving registers 76 is determined in the following fashion. The output from the master trigger generator 24 is coupled to the input of a single shot or multvibrator and delay 88 in addition to the modulator input 26. The delay from the single shot 88 compensates for switching delays in both the home and remote stations 12 and 14. The output from the single shot 88 is coupled to the input of a second single shot 90 which generates a pulse of a predetermined width at its output for a reason to be subsequently described. The output from the single shot 90 is coupled to a reset input of a distance counter 92 and is also coupled to the enabling input of a distance timing oscillator 94. Upon generation of pulse from the single shot 90, the distance timing oscillator 94 begins to run and has its output connected to the clock input of the distance counter 92. The output from the distance counter 92 in turn is fed into the data inputs of the Distance receiving register 76. Thus, upon receipt of a strobe pulse from the AND gate 68, indicative that a distress signal has been received, the count in the counter 92 is loaded into the Distance receiving register 76. The count in the counter 92 is thus representative of the elapsed time between the generation of an interrogation pulse by the master trigger generator 24 and the receipt of a distress signal by the home station 12. This elapsed time is likewise representative of the distance between the home and remote stations and this distance or count is loaded into the register 76 by the strobe pulse.

At the termination of the output pulse from the single shot 90, the oscillator 94 is disabled and the counter 92 is rest to zero. This provision limits the maximum count in the counter 92 and thus the maximum range of the home station 12 to, for example, 50 miles. This range limitation inhibits the distance measurement for reflected or secondary distress signals.

From the foregoing it can be seen that the count in the Azimuth receiving register 72 is indicative of the Azimuth position of the remote station 14 while the count in the Distance receiving register 76 is indicative of the distance between the home and remote stations so that with this information the position of the remote station 14, and hence the ship 16 in distress, can be pinpointed. Moreover, the type of emergency encountered at the remote station is stored in the Type Emergency receiving register 74. It would, of course, be possible to directly display the contents of the Azimuth receiving register 72, the Type Emergency receiving register 74 and the Distance receiving register 76 in order to determine the position of the remote station and the type of emergency there encountered. Such an arrangement, however, is disadvantageous in that the receipt of a subsequent distress signal would replace the original distress signal. Thus, if a subsequent distress signal closely followed the original distress signal, the information from the original distress signal would be lost.

To avert the possibility of losing distress data, the output from the Azimuth receiving register 72 is fed through a holding register 96 and a display register 98 before the signal is displayed via a decoder/driver 100 on an Azimuth display 102. Likewise, the Type Emergency receiving register 74 is fed through a holding register 104, a display register 106 and through a decoder/driver 108 to a Type Emergency display 110. Identically, the Distance receiving register 76 is fed through a holding register 112, a display register 114 and through a decoder/driver 116 to the Distance display 118. The output displays 102, 110 and 118 can be of any conventional nature, for example, an LED display, liquid crystal, or the like.

Circuitry for loading the information from the receiving registers into the holding registers and for loading the holding register into the display registers is best shown in FIG. 4. The circuit means for loading the holding and display registers includes a first comparator 120 and a second comparator 122. The first comparator 120, compares the receiving registers with their respective holding registers. In the event that the count in any receiving register differs from the count in its holding register, the comparator generates an output signal along one or more lines 124 to an OR gate 126.

The comparator 122 functions in substantially the same manner as the comparator 120 except that the Azimuth Emergency Type and Distance receiving registers are compared with their respective display registers and, in the event of a difference between the two, the comparator 122 generates an output signal along one or more of lines 132 to an OR gate 134.

The output from the OR gates 126 and 134 are coupled to the inputs of an AND gate 136 which generates an output signal only when the receiving registers differ from both the holding and display registers for at least one of the three compared quantities, i.e., Azimuth, Emergency Type or Distance. This, of course, would occur when the first distress signal is received by the home station 12.

The output from the AND gate 136 is coupled through a delay singal shot 138 to the clock input of a Pending Emergency latch 140. In addition, the output from the delay single shot 138 is respectively coupled by lines 142, 144, and 146 to the load input of the Azimuth holding register, Emergency Type holding register, and Distance holding register (FIGS. 3 and 4).

Simultaneously, the delay single shot 138 sets the latch 140 and drives the latch output Q high which illuminates a bulb 148 indicating to the operator at the home station 12 that an emergency distress signal has been received. For a reason to be later described, the latch output Q is also connected to one input of an AND gate 160. The operator at the home station then closes a reset switch 150 which simultaneously resets the latch 140 and generates an output signal through an OR gate 152 to lines 154, 156 and 158. The lines 154–158 are coupled respectively to the load inputs of the Azimuth, Emergency Type and Distance display registers which loads the information from the holding registers into the display registers whereby the stored information is displayed by the display means 102, 110, and 118.

In the event, however, that a subsequent emergency distress signal is received by the home station before the home station operator can depress the reset switch 150, both comparators 122 and 120 generate an output signal which, in turn, produces an output signal at the output of the AND gate 136. In this event, both inputs of the AND gate 160 go high so that the AND gate 160 generates an output signal through the OR gate 152 which loads the display registers from the holding registers. Similarly, following the delay of the single shot 138, the holding registers are loaded from the receiving registers. This provision thus permits two separate and distinct distress signals to be retained at the home station. The subsequent depression of the switch 150 will, of course, display the second received distress signal.

Alternatively, of course, the receiving registers 72, 74 and 76 in the home station 12 can be fed as input data to suitable computing means, such as a microprocessor, for processing and display on a suitable I/O device, such as a CRT terminal. While such a system would increase the cost of the home station 12, it would increase the flexibility of the system 10 of the present invention in that multiple distress signals could be received and stored.

From the foregoing it can thus be seen that the transponder-responder system 10 of the present invention provides a simple and yet effective means whereby the position and type of emergency encountered at the remote station can be rapidly pinpointed and identified respectively. Moreover, with the advent of microelectronics and integrated circuitry, both the remote and home stations can be relatively inexpensively constructed in a manner which has been heretofore infeasible.

Moreover, while the transponder-responder system of present invention has been described for use as a watercraft emergency distress system, it is, of course, apparent that the system 10 can be put to other uses. For example, in high crime rate areas it would be feasible for persons to carry individual remote stations 14 and for the home station 12 to be operated by the police authorities. Thus, in the event of an emergency, the police authorities could pinpoint the location of the emergency and rapidly send help.

Having described my invention, many modifications thereto will become apparent to those skilled in the art to which it pertains without deviation from the spirit of the invention as defined by the scope of the appended claims.

I claim:

1. A transponder-responder system comprising a home station and at least one remote station, said home station having means for transmitting a periodic interrogation pulse via a directional antenna and means for varying the rotational position of said antenna, said remote station comprising means for receiving said interrogation pulse, means for transmitting an encoded signal is response to the receipt of said interrogation pulse, and means for varying the encoding of said encoded signal, and said home station further comprising means for receiving said encoded signal, means for decoding said encoded signal, means for determining the elapsed time between the transmission of the last interrogation pulse and the receipt of said encoded signal, means for determining the rotational position of the directional antenna and means for storing two encoded signals from two remote stations, said storing means further comprising a receiving register for storing the rotational position of said antenna, the decoded signal and said elapsed time upon the receipt of said encoded signal, the output of each receiving register being connected to the input of a holding register, the output from each holding register being connected to the input of a display register and means for displaying the contents of each display register, and upon receipt of two successive encoded signals by the home station, means for automatically loading the display registers with information pertinent to the first received encoded signal and for automatically loading the holding registers with information pertinent to the second received encoded signal.

2. The invention as defined in claim 1 and including manually operated means for loading said display registers with the contents of said holding registers.

3. The invention as defined in claim 1 wherein said remote station includes means for indicating the transmission of said encoded signal from said remote station.

4. The invention as defined in claim 1 wherein said means for varying the encoding of the encoded signal at the remote station comprises a multibit parallel-to-serial shift register having a clock input and a data input for each bit position, switch means for presetting at least two data inputs, and oscillator means operating at a predetermined frequency coupled to the input of said shift register, wherein the serial output from said shift register is operatively coupled to a transmitter at the remote station.

5. The invention as defined in claim 4 wherein said decoding means comprises a multibit serial-to-parallel shift register having a serial data input and a clock input, a second oscillator operating at said predetermined frequency coupled to the clock input of said serial-to-parallel shift register, and the output from said home station receiving means being coupled to the serial input of said last-mentioned shift register, whereby the parallel-to-serial shift register at the remote station is synchronized in operation with the serial-to-parallel shift register at the home station.

6. The invention as defined in claim 1 wherein said remote station receiving means and said home station transmitting means are tuned to a first frequency and wherein said remote station transmitting means and said home station receiving means are tuned to a second frequency.

7. The invention as defined in claim 1 wherein said means for determining the rotational position of said antenna comprises an Azimuth wheel coupled to said antenna so that said wheel rotates in unison with said antenna, said wheel having markings formed at predetermined intervals around its periphery, stationary pickup means for detecting said markings on said wheel and generating an output signal in response thereto, and counting means having an input connected to the output from said pickup means whereby the count in said counter is representative of the rotational position of said Azimuth wheel.

* * * * *

UNITED STATES PATENT AND TRADEMARK OFFICE
CERTIFICATE OF CORRECTION

PATENT NO. : 4,107,675
DATED : August 15, 1978
INVENTOR(S) : John C. Sellers and James A. Romanauski It is certified that error appears in the above-identified patent and that said Letters Patent are hereby corrected as shown below:

Column 1, line 48, delete "t" and insert --to-- therefor;
Column 2, line 36, delete "respnse" and insert --response-- therefor;

*Signed and Sealed this*

*Twenty-seventh* Day of *February 1979*

[SEAL]

*Attest:*

RUTH C. MASON
*Attesting Officer*

DONALD W. BANNER
*Commissioner of Patents and Trademarks*